(12) United States Patent
Chang et al.

(10) Patent No.: US 7,078,844 B2
(45) Date of Patent: Jul. 18, 2006

(54) HEAT-DISSIPATING DEVICE AND MOTOR STRUCTURE THEREOF

(75) Inventors: Shun-Chen Chang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/844,356

(22) Filed: May 13, 2004

(65) Prior Publication Data

US 2005/0110366 A1 May 26, 2005

(30) Foreign Application Priority Data

Nov. 20, 2003 (TW) .............................. 92132497 A

(51) Int. Cl.
*H02K 1/12* (2006.01)
(52) U.S. Cl. ..................... 310/254; 310/71; 310/89; 310/216
(58) Field of Classification Search ............ 310/68 R, 310/68 B, 71, 201, 216, 268, 89, 91, 254, 310/258–259
See application file for complete search history.

(56) References Cited

U.S. PATENT DOCUMENTS

| 3,469,772 | A | | 9/1969 | McDonald |
|---|---|---|---|---|
| 3,912,956 | A | * | 10/1975 | Muller ...................... 310/68 C |
| 5,874,796 | A | * | 2/1999 | Petersen ................ 310/156.45 |
| 5,945,766 | A | * | 8/1999 | Kim et al. .................. 310/268 |
| 6,508,621 | B1 | | 1/2003 | Zeighami et al. |

FOREIGN PATENT DOCUMENTS

TW 479897 11/1990

\* cited by examiner

Primary Examiner—Thanh Lam
(74) Attorney, Agent, or Firm—Birch, Stewart, Kolasch & Birch, LLP

(57) ABSTRACT

A heat-dissipating device and a motor structure. The heat-dissipating device has a outer frame provided with a seat, at least two rotors, a control unit and a stator. The rotors are respectively disposed on the seat. The control unit is disposed on the seat for controlling the rotation of the rotors. The stator for driving the rotors includes a plurality of silicon steel sheets or iron core embedded in the seat and a plurality of coils. Controlling the rotors with a single stator and a single control unit reduce the volume and cost of the heat-dissipating device.

23 Claims, 6 Drawing Sheets

HEAT-DISSIPATING DEVICE AND MOTOR STRUCTURE THEREOF

This Non-provisional application claims priority under 35 U.S.C. § 119(a) on Patent Application No(s). 092132497 filed in Taiwan on Nov. 20, 2003, the entire contents of which are hereby incorporated by reference.

BACKGROUND OF THE INVENTION

1. Field of the Invention

The present invention relates to a heat-dissipating device and a motor structure, and in particular to a motor structure having a single stator, a single control unit and two or more rotors.

2. Description of the Related Art

Axial-flow fans are typically characterized by a simple structure, low cost and high airflow volume. As such, they have been widely applied in electronic products, such as personal and notebook computers, to dissipate heat generated by components disposed therein. Typically, to provide a system with uninterrupted operation in the event of failure in on of the fans, another independent and redundant axial-flow fans are commonly used to prevent internal components from being damaged due to overheating.

As shown in FIG. 1, a conventional axial-flow fan has a motor 11, an impeller 12 and a frame 13. The impeller 12 connected to the motor 11 is disposed in the frame 13. Two independent axial-flow fans are connected to each other and arranged in series by bolts or screws.

Assembled axial-flow fans arranged in series, however, will occupy a larger volume than normal axial-flow fans. Moreover, the assembling process for the assembled axial-flow fans is complicated, hence cost and assembly time cannot be reduced.

During operation, resistance of the assembled axial-flow fans increases abnormally, and blast pressure provided thereby cannot meet requirements or far less than individual axial-flow fan individually, hence efficiency of the assembled axial-flow fans is reduced. Thus, one solving way is to space the axial-flow fans apart by a distance to reduce interference; however, it will be limited by the inner space provided by the electronic product.

Further, the axial-flow fan described above or a general blower provides only one motor and one rotor. Thus, a design incorporating number of motors and rotors limits the performance of the axial-flow fan or the blower, and thus volume and cost for the axial-flow fan or the blower cannot be reduced.

SUMMARY OF THE INVENTION

Accordingly, an object of the invention is to provide a heat-dissipating device with a motor structure to overcome the problems of the above-described assembled axial-flow fans arranged in series.

The invention discloses a motor structure of a heat-dissipating device having a single stator, a single control unit and dual rotors. The heat-dissipating device has an outer frame, at least two rotors and a stator. The outer frame has a seat and the rotors are respectively disposed on the seat. The stator has an electromagnetic element embedded in the seat and a coil to drive the rotors. The seat is provided with a connecting portion connected to the inner surface of the outer frame, for fixedly receiving the seat in the outer frame. The connecting portion is composed of ribs or stator blades. Sleeves are formed on the seat to receive the bearings of the shafts for supporting the shafts of the rotors. A plurality of hollow portions provided on the seat extend outward from sides of the seat, and each hollow portion has a through hole penetrating through the seat. The electromagnetic element is embedded in the through hole of the hollow portions, and the coil is wound around at least one side of the hollow portions of the seat.

The heat-dissipating device further includes a control unit, such as a PCB, disposed on the seat. The control unit has several electronic components for driving and controlling the rotation of the heat-dissipating device and Hall elements. One of the rotors is active and the other is passive, and the magnetic field of the active rotor is detected by one Hall element on the PCB so as to control the magnetic forces of the coils to drive the active rotor. The passive rotor is synchronically rotated in the same or counter direction with respect to the active rotor while switching the magnetic forces of the coils. Both the active rotor and the passive rotor respectively includes a hub, a plurality of blades, a magnetic ring and an iron sheet. The iron sheet and the magnetic ring are sequentially disposed inside the hub. The magnetic ring of the active rotor and the magnetic ring of the passive rotor are respectively disposed on ends of the electromagnetic element to induce magnetic field. The control unit further includes another Hall element to detect the speed of the passive rotor. The heat-dissipating device is an axial-flow fan, a ventilator, a blower, or a centrifugal fan.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 2A:
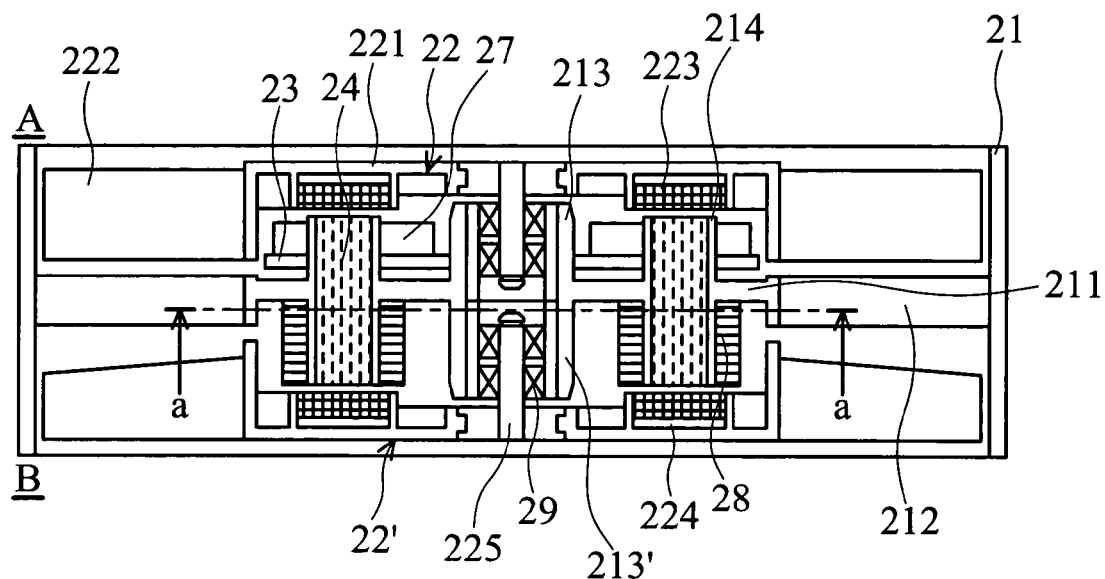
FIG. 2A is a longitudinally sectional view of a heat-dissipating device according to the first preferred embodiment of the present invention.

Referring to FIG. 2A, in a preferred embodiment of the invention, a heat-dissipating device is a serial-type fan, having an outer frame 21, a seat 211, two rotors 22/22' and a stator. The seat 211 is connected to the inner surface of the outer frame 21 by a connecting portion 212 for fixedly receiving the seat 211 in the outer frame 21. The connecting portion 212 can be a plurality of ribs or stator blades. Two sleeves 213, 213' are respectively formed on two opposite sides of the seat 211 for receiving the bearing 29 and supporting the sleeves 213, 213' receive the shafts 225 of the rotors 22, 22'. Four hollow portions 214 are formed on and penetrate through the seat 211, and the ends of each hollow portion 214 extend outward from sides of the seat 211. Each hollow portion 214 has a through hole 214$h$.

The stator is constituted by a plurality of silicon steel sheets 24 and a plurality of coils 28. The silicon steel sheets 24 are respectively embedded in the through holes 214$h$ of each hollow portion 214 of the seat 211, and the coil 28 is disposed around one side of the hollow portions 214 of the seat 211. In this embodiment, cores or other elements providing the same function can replace the silicon steel sheets 24.

Figure 2B:
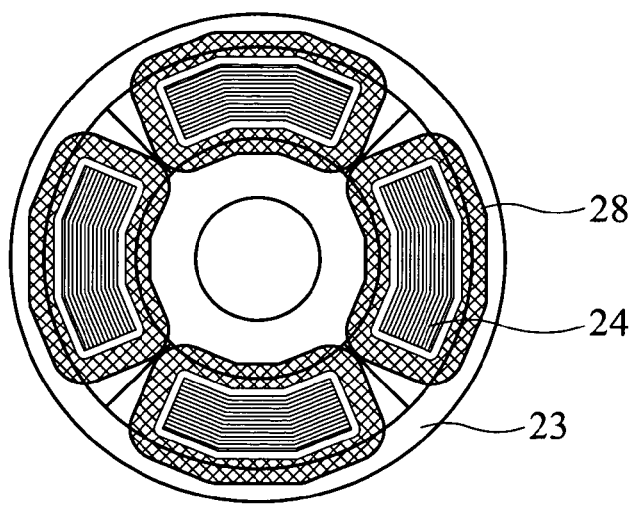
FIG. 2B is a partially enlarged cross-sectional view of the heat-dissipating device along line a—a of FIG. 2A.

FIG. 2B is a partially cross-sectional view of the heat-dissipating device along the line a—a of FIG. 2A. Four sets of silicon steel sheets 24 and four sets of coils 28 are provided to form four poles of a motor. Additionally, the heat-dissipating device has a control unit 23, such as a PCB, disposed on the other side of the seat 211. The control unit 23 has several electronic components 27 for driving and controlling the rotation of the heat-dissipating device and Hall elements 230, 230'.

Figure 3A:
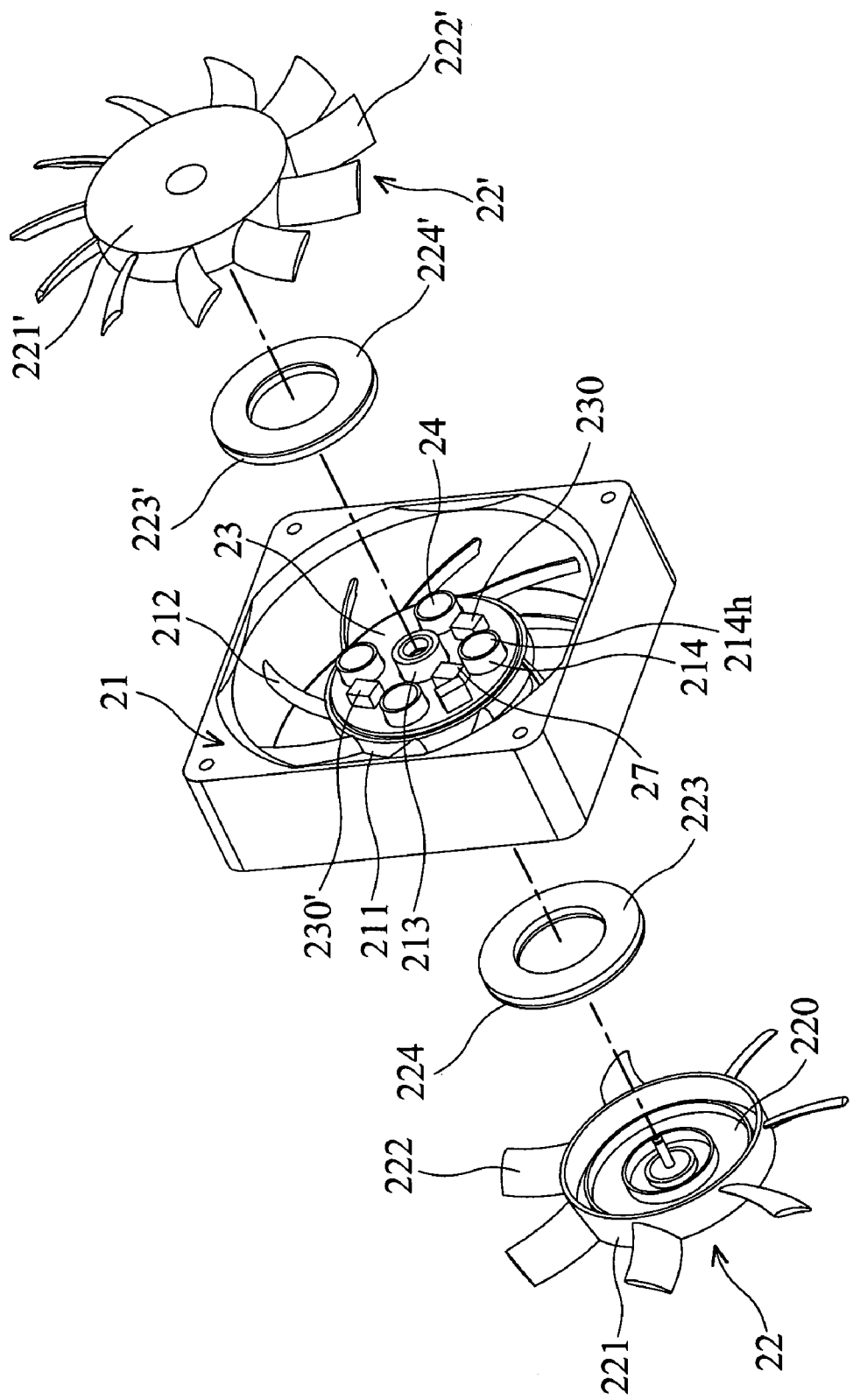
FIG. 3A is an exploded perspective view of the heat-dissipating device observed from one side ("A") of FIG. 2A.
Figure 3B:
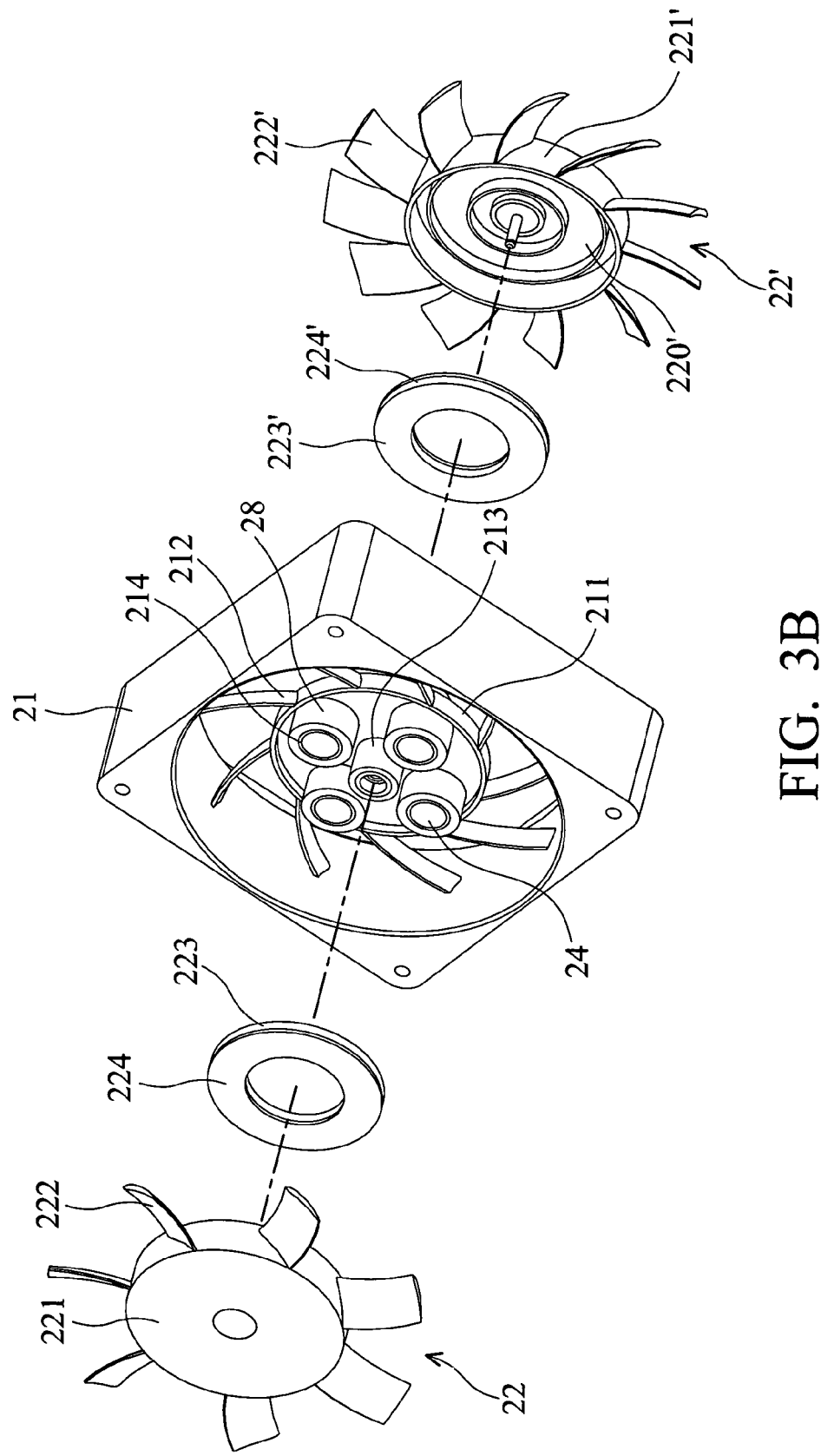
FIG. 3B is an exploded perspective view of the heat-dissipating device observed from another side ("B") of FIG. 2A.

FIGS. 3A and 3B are two exploded perspective views of the heat-dissipating device observed from two different sides "A" and "B" of FIG. 2A.

The rotors 22, 22' are arranged in series, disposed on each side of the seat 211 in the outer frame 21, respectively. In this embodiment, the rotor 22 is active and the rotor 22' is passive. The active/passive rotor 22/22' are respectively constructed by a hub 221/221', a plurality of blades 222/222', a magnetic ring 223/223' and an iron sheet 224/224'. The iron sheet 224/224' and the magnetic ring 223/223' are sequentially attached on the inner surface 220/220' of the hub 221/221', and the blades 222/222' are disposed on the outer circumference of the hub 221/221'. The number of blades 222 of the active rotor 22 can be equal to or different from the blade 222' of the passive rotor 22'.

In FIG. 3A, the control unit 23 is disposed on one side of the seat 211, and the silicon steel sheets 24 are respectively embedded in the through holes 214$h$ of each hollow portion 214 of the seat 211. In FIG. 3B, the coil 28 is disposed around one side of the hollow portions 214 of the seat 211.

As the hub 221/221', the magnetic ring 223/223' and the iron sheet 224/224' of the active/passive rotor 22/22' are properly installed on the seat 211, the magnetic rings 223, 223' are respectively located on both ends (that top and bottom sides) of each silicon steel sheet 24, as shown in FIG. 2A.

When current from a power supply (not shown) travels through the coils 28, the coils 28 induce magnetic field to drive the active rotor 22 to rotate about its axis. The Hall element 230 provided on the PCB 23 detects the change of magnetic field of the active rotor 22 and directs the magnetic force of the coils 28 to rotate the active rotor 22. Thus, the passive rotor 22' is rotated synchronically, in the same or counter direction with respect to the rotation of the active rotor 22 while switching magnetic forces of the coils 28. Additionally, the Hall element 230' on the PCB 23 is used to detect the speed of the passive rotor 22'.

Figure 4:
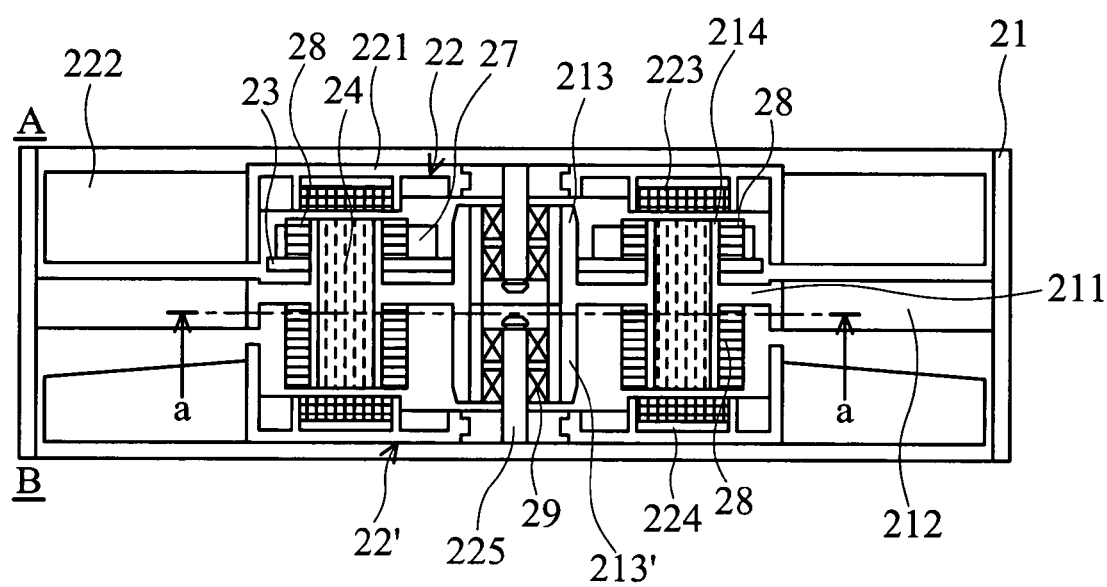
FIG. 4 is a longitudinally sectional view of a heat-dissipating device according to the second preferred embodiment of the present invention.

In addition to the above-described embodiment, the coil 28 can also be wound around both sides of the hollow portions of the seat as shown in FIG. 4.

Figure 1:
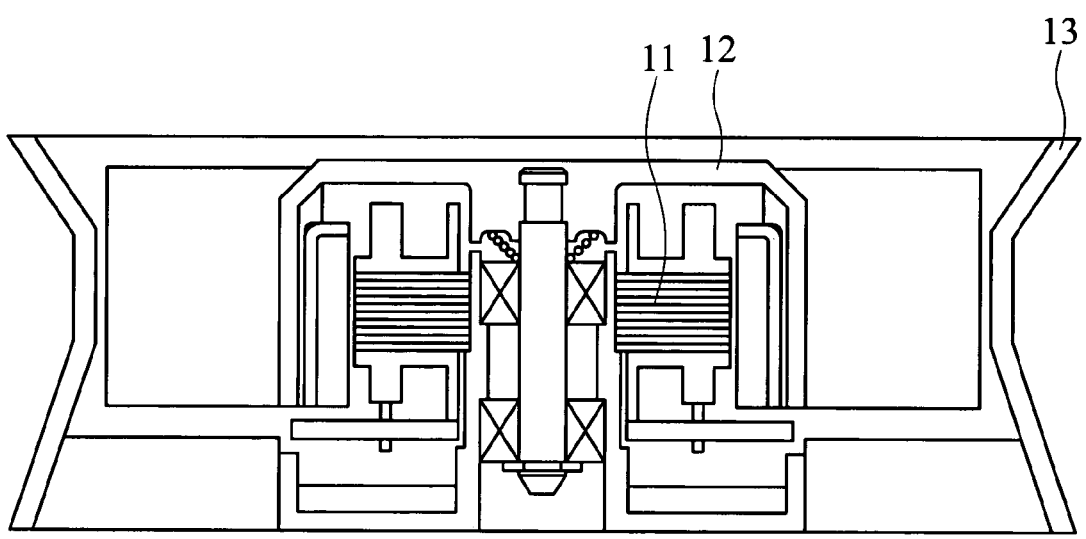
FIG. 1 is a longitudinally sectional view of a conventional related axial-flow fan.
Figure 5:
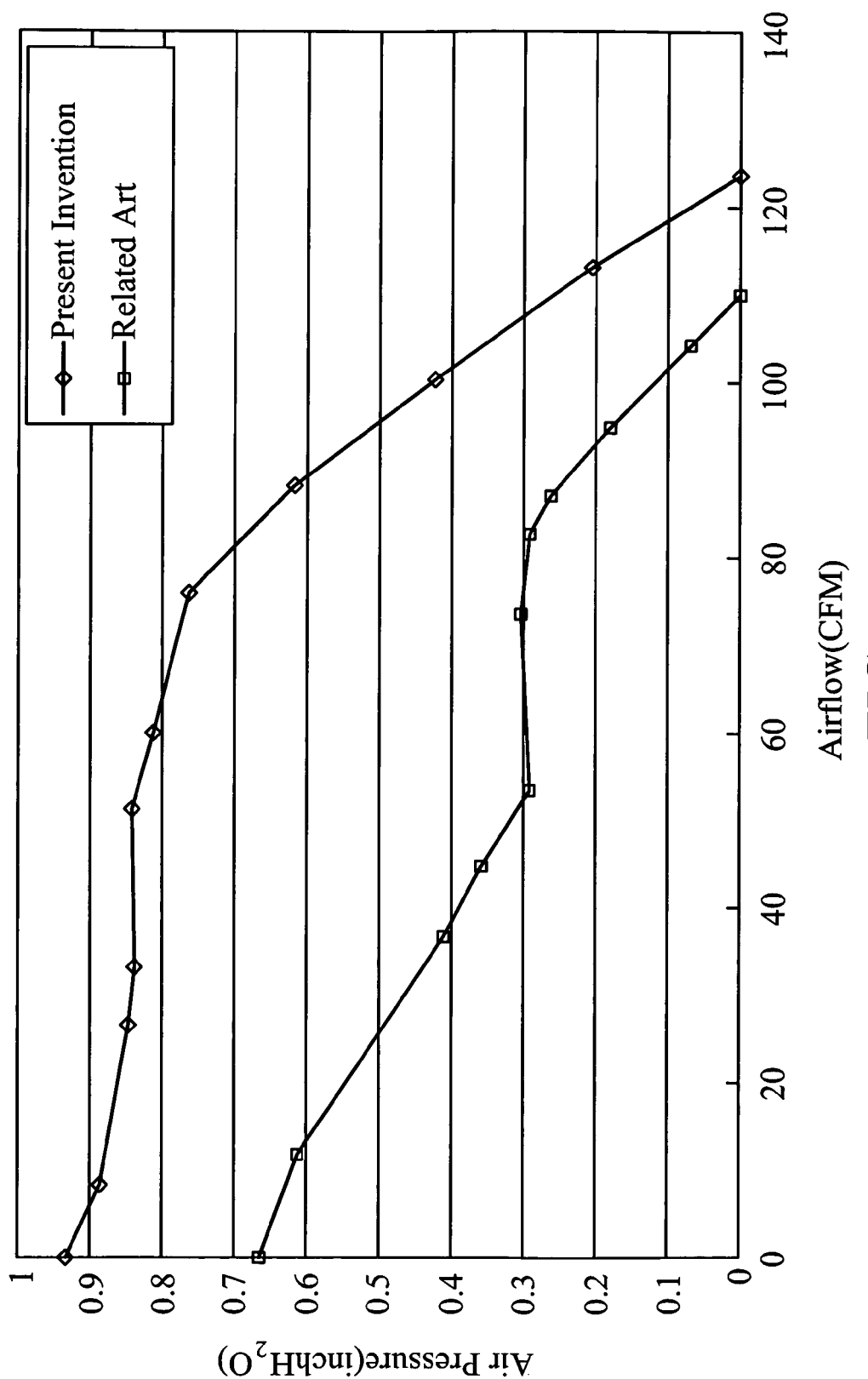
FIG. 5 shows a characteristic comparison of air pressure and airflow between the axial flow fan of FIG. 1 and that of the present invention.

In FIG. 5, air pressure and airflow of the heat-dissipating device of the invention are greatly larger than those of serial fan of FIG. 1.

Although the number of poles of the motor mentioned above is four, the feature of the invention is not limited to this embodiment and is applicable to other motors with different numbers of poles.

Additionally, because the heat-dissipating device of the invention applies only one stator and one control unit to control the rotors, it is to be understood that volume of the heat-dissipating device and cost are reduced, and air pressure and airflow of the heat-dissipating device are enhanced.

While the invention has been described in connection with what is presently considered to be the most practical and preferred embodiment, it is to be understood that the invention is not limited to the disclosed embodiments, but, on the contrary, is intended to accommodate various modifications and equivalent arrangements included within the spirit and scope of the appended claims.

What is claimed is:

1. A heat-dissipating device, comprising:
   a fixed seat;
   a plurality of hollow portions penetrating through the fixed seat and extending outward from sides of the fixed seat, wherein each hollow portion has a through hole;
   at least two rotors respectively disposed on the fixed seat;
   a control unit disposed on the fixed seat for controlling the rotation of the rotors; and
   a stator having a plurality of silicon steel sheets or cores embedded in the through holes of the hollow portions of the fixed seat, and a plurality of coils for driving the rotors.

2. The heat-dissipating device as claimed in claim 1, wherein the control unit comprises a PCB.

3. The heat-dissipating device as claimed in claim 2, wherein the PCB has a plurality of electronic components.

4. The heat-dissipating device as claimed in claim 3, wherein one of the rotors is active and the other is passive, and the magnetic field of the active rotor is detected by a Hall element of the PCB so as to control a switch of magnetic forces of the coils to drive the active rotor, and the passive rotor is synchronically rotated in the same or counter direction with respect to the active rotor while switching the magnetic forces of the coils.

5. The heat-dissipating device as claimed in claim 4, wherein the control unit further comprises a Hall element to detect the speed of the passive rotor.

6. The heat-dissipating device as claimed in claim 4, wherein both the active rotor and the passive rotor comprise a hub, a plurality of blades, a magnetic ring and an iron sheet, and the iron sheet and the magnetic ring are sequentially disposed on the inner surface of the hub.

7. The heat-dissipating device as claimed in claim 6, wherein the magnetic ring of the active rotor and the magnetic ring of the passive rotor are respectively disposed on ends of the silicon steel sheets or cores to induce magnetic field.

8. The heat-dissipating device as claimed in claim 1, wherein a plurality of sleeves are formed on sides of the fixed seat, and the sleeves receive the shafts of the rotors and support the bearings of the shafts.

9. The heat-dissipating device as claimed in claim 1, wherein the silicon steel sheets or cores are respectively embedded in the through hole of each hollow portion.

10. The heat-dissipating device as claimed in claim 9, wherein the coils are respectively wound round the hollow portions of the fixed seat.

11. The heat-dissipating device as claimed in claim 1 further comprising an outer frame for fixedly installing the fixed seat and receiving the rotors arranged in series.

12. The heat-dissipating device as claimed in claim 11, wherein the fixed seat is connected to the inner surface of the outer frame by a connecting portion, for fixedly receiving the fixed seat in the outer frame and allowing the at least two rotors to be arranged in the outer frame in series.

13. The heat-dissipating device as claimed in claim 12, wherein the connecting portion is formed by ribs or stator blades.

14. The heat-dissipating device as claimed in claim 1, wherein the control unit and the coils are respectively disposed on opposite sides of the fixed seat.

15. A heat-dissipating device, comprising:
an outer frame having a fixed seat disposed therein;
a connecting portion connecting the fixed seat to an inner surface of the outer frame, for fixedly receiving the fixed seat in the outer frame;
at least two rotors respectively disposed on the fixed seat and arranged in the outer frame in series; and
a stator having an electromagnetic element embedded in the fixed seat, and a coil for driving the rotors.

16. The heat-dissipating device as claimed in claim 15, wherein the heat-dissipating device is an axial-flow fan, a ventilator, a blower, or a centrifugal fan.

17. A motor structure for a fan having a fixed seat, comprising:
at least two rotors respectively disposed on the fixed seat;
a stator having an electromagnetic element embedded in the fixed seats and a coil for driving the rotors; and
a control unit disposed on the fixed seat and having a plurality of electronic components and a Hall element for driving and controlling the rotation of the heat-dissipating device; wherein one of the rotors is active and the other is passive, and the magnetic field of the active rotor is detected by the Hall element so as to control the switched magnetic forces of the coils to drive the active rotor, and the passive rotor is synchronically rotated in the same or counter direction with respect to the active rotor while switching the magnetic forces of the coils.

18. The motor structure as claimed in claim 17, wherein the fixed seat has at least one hollow portion penetrating the fixed seat and extending outward from sides of the fixed seat, and each hollow portion has a through hole.

19. The motor structure as claimed in claim 17, wherein the electromagnetic element is embedded in the through hole of each hollow portion.

20. The motor structure as claimed in claim 19, wherein the coil is disposed on at least one side of the hollow portions of the fixed seat.

21. The motor structure as claimed in claim 17, wherein the active rotor and the passive rotor respectively have a magnetic ring disposed on ends of the electromagnetic element to induce magnetic field.

22. The motor structure as claimed in claim 21, wherein the control unit further comprises another Hall element to detect the speed of the passive rotor.

23. The motor structure as claimed in claim 17, wherein the electromagnetic element is silicon steel sheets or core.

* * * * *